(12) United States Patent
McElvain

(10) Patent No.: US 7,339,701 B2
(45) Date of Patent: Mar. 4, 2008

(54) METHOD FOR DARKNESS CORRECTION OF TRAPPED PIXELS

(75) Inventor: Jon S. McElvain, Redondo Beach, CA (US)

(73) Assignee: Xerox Corporation, Norwalk, CT (US)

( * ) Notice: Subject to any disclaimer, the term of this patent is extended or adjusted under 35 U.S.C. 154(b) by 974 days.

(21) Appl. No.: 10/320,832

(22) Filed: Dec. 16, 2002

(65) Prior Publication Data

US 2004/0114162 A1 Jun. 17, 2004

(51) Int. Cl.
*H04N 1/50* (2006.01)
*H04N 1/58* (2006.01)

(52) U.S. Cl. .............. 358/1.9; 358/1.14; 358/518; 358/3.26; 358/504; 382/165; 382/167; 382/178; 382/199; 382/203

(58) Field of Classification Search ............... 358/1.9, 358/1.7, 1.14, 518, 1.15, 3.26, 504; 382/167, 382/162, 165, 178, 199, 203; 345/620, 622
See application file for complete search history.

(56) References Cited

U.S. PATENT DOCUMENTS

| | | | | |
|---|---|---|---|---|
| 4,951,160 A | * | 8/1990 | Nagahara et al. ............ 358/1.7 |
| 5,668,931 A | * | 9/1997 | Dermer ........................ 358/1.4 |
| 6,262,747 B1 | * | 7/2001 | Rocheleau et al. .......... 345/620 |
| 6,345,117 B2 | | 2/2002 | Klassen ........................ 382/167 |
| 6,504,949 B2 | * | 1/2003 | Matsukubo et al. ......... 382/162 |
| 6,844,942 B2 | * | 1/2005 | Rumph et al. ................ 358/1.9 |
| 7,123,381 B2 | * | 10/2006 | Klassen ........................ 382/167 |
| 2003/0043424 A1 | * | 3/2003 | Bhaskar et al. .............. 358/518 |
| 2003/0063338 A1 | * | 4/2003 | Gudaitis et al. .............. 358/519 |
| 2003/0142865 A1 | * | 7/2003 | Hirota et al. ................. 382/167 |
| 2003/0160985 A1 | * | 8/2003 | Bailey .......................... 358/1.9 |

\* cited by examiner

*Primary Examiner*—Douglas Q. Tran
*Assistant Examiner*—Chan S. Park
(74) *Attorney, Agent, or Firm*—Jeannette Walder

(57) ABSTRACT

A method for correcting for edge defects caused by print characteristics of a print engine includes printing a set of actual color patches corresponding to a desired set of colors; defining an edge region and a uniform area region in each of the patches; for each color patch in the set of actual color patches: determining a difference between color in the edge region of the patch and color in the uniform area region of the patch; and generating an edge response to adjust color output of the print engine in the edge region to substantially match color output in the uniform area region. The method can perform edge correction for any edge region of an image. In one embodiment of the invention, the edge region may be determined by a trap engine associated with the print engine and the method can provide correction for trap pixels.

12 Claims, 2 Drawing Sheets
(2 of 2 Drawing Sheet(s) Filed in Color)

METHOD FOR DARKNESS CORRECTION OF TRAPPED PIXELS

FIELD OF THE INVENTION

This invention relates generally to methods for correcting for marking engine characteristics, and more particularly, to a method for correcting for edge modulations caused by the marking engine characteristics in order to achieve traps that are more visually pleasing.

BACKGROUND OF THE INVENTION

Electronic processing of graphic and text images produces multi-color prints using multiple color separations. Typically, four process colors, cyan, magenta, yellow and black, are used to print multiple separations, which tend to have minor misregistration problems. The result of abutting or overlapping shapes is a boundary between adjacent regions of color that, under ideal printing conditions should have zero width. That is, one color should stop exactly where the abutting color begins, with no new colors being introduced along the boundary by the printing process itself. The "colors" which fill the shapes can be solid colors, tints, degrades, contone images, or "no fill" (i.e., the paper with no ink applied). In general, the "colors" represented in these adjacent regions are printed using more than one colorant. In practice therefore, the realization of a zero width boundary between regions of different color is impossible as a result of small but visible misregistration problems from one printed separation to another. The error is manifested as a "light leak" or as a visible boundary region of an undesired color.

Methods for correcting for this misregistration are known. The general approach is to expand one of the abutting regions' separations to fill the gap or misregistration border region with a color determined to minimize the visual effect when printed. Borders or edges expanded from a region of one color to another in this manner are said to be "spread". A border which has been expanded is referred to as a "trap", and the zone within which color is added is called the "trap zone". Edge detection and image manipulation to perform trapping may be done in any of several processes, including for example, the technique described in U.S. Pat. No. 6,345,117 to Victor Klassen, for "Method for Automatic Trap Selection for Correcting for Separation Misregistration in Color Printing".

Certain marking systems produce variations in desired output color from print engine to print engine. These variations are due to specific physical characteristics of the particular print engine. A common technique for correcting for variations in color output is to measure a set of printed colors against a set of control colors and to provide a lookup table generated from an analytic function (such as a gamma correction function) to correct for variations in color output. Thus, all print engines of a particular model can be corrected to have the same desired output color.

Certain marking systems exhibit difficulty maintaining color uniformity near edges. For example, it may be intended to place a 75% fill, which may be possible in the body of the fill object; however, within a few millimeters of the edges, more or less than 75% may be deposited, depending on the marking process. For trapping, this can be a significant problem, as the trapping operation fundamentally only modifies edge pixels of abutting objects. If the trapping engine specifies a trap color (for a given separation) of 35%, only 20% may be produced as a result of the edge physics, for example. It is therefore desirable to have the capability to correct for these edge modulations, in order to achieve traps that are more pleasing to the eye.

SUMMARY OF THE INVENTION

A method for correcting for edge defects caused by print characteristics of a print engine, according to one aspect of the invention, includes printing a set of actual color patches corresponding to a desired set of colors; defining an edge region and a uniform area region in each of the patches; for each color patch in the set of actual color patches: determining a difference between color in the edge region of the patch and color in the uniform area region of the patch; and generating an edge response to adjust color output of the print engine in the edge region to substantially match color output in the uniform area region. The method can perform edge correction for any edge region of an image. In one embodiment of the invention, the edge region may be determined by a trap engine associated with the print engine and the method can provide correction for trap pixels.

The edge response may be implemented as a percentage difference in color for each color in the desired set of colors. Alternatively, the edge response may be implemented by building an edge correction table for each color in the desired set of colors; and using the edge correction table to adjust color output of the print engine in the edge region of images. The edge correction table may be generated by an analytic function, such as a gamma correction function. Alternatively, the edge correction table may be generated based on actual measurements of the print engine differences between edge regions and uniform area regions.

The method may be used in combination with a method that corrects for color differences in uniform area regions in images. The method may further include obtaining a set of control color patches representing the set of desired colors; for each color in the set of desired colors: determining a difference between color in the uniform area region of the actual patch and color in the uniform area region of the control patch; and generating a uniform area response to adjust color output of the print engine in the uniform area region to substantially match color of the control color patch. The uniform area response may include a percentage difference in color for each color in the desired set of colors or a uniform area correction table for each color in the desired set of colors.

The method of the invention corrects for marking engine characteristics associated with edges in an image. In many marking engines, color uniformity cannot be maintained near edges; this presents a significant problem for trapping. The method may be used to correct trap pixels generated by a trap engine associated with the print engine. If the edge region is determined by a trap engine associated with the print, the method further includes building a trap correction lookup table; building an edge correction table for each color in the desired set of colors; and using the edge correction table to adjust the trap correction lookup table. The method applies a correction to trap pixels using one or more mechanisms, including either a lookup table or an analytic correction. The correction may be determined empirically. The trap engine correction table could be modified and thus could be used directly to effect the correction, however, a separate correction table may also be used. A separate correction table could be applied to each color separation since the several color markers may have different edge rendering characteristics. The method takes into account edge effects of the marker, as well as the colors of adjoining image areas.

BRIEF DESCRIPTION OF THE FIGURES

The patent or application file contains at least one drawing executed in color. Copies of this patent or patent publication application with color drawing(s) will be provided by the Office upon request and payment of the necessary fee.

DETAILED DESCRIPTION OF THE EMBODIMENTS

Figure 1:
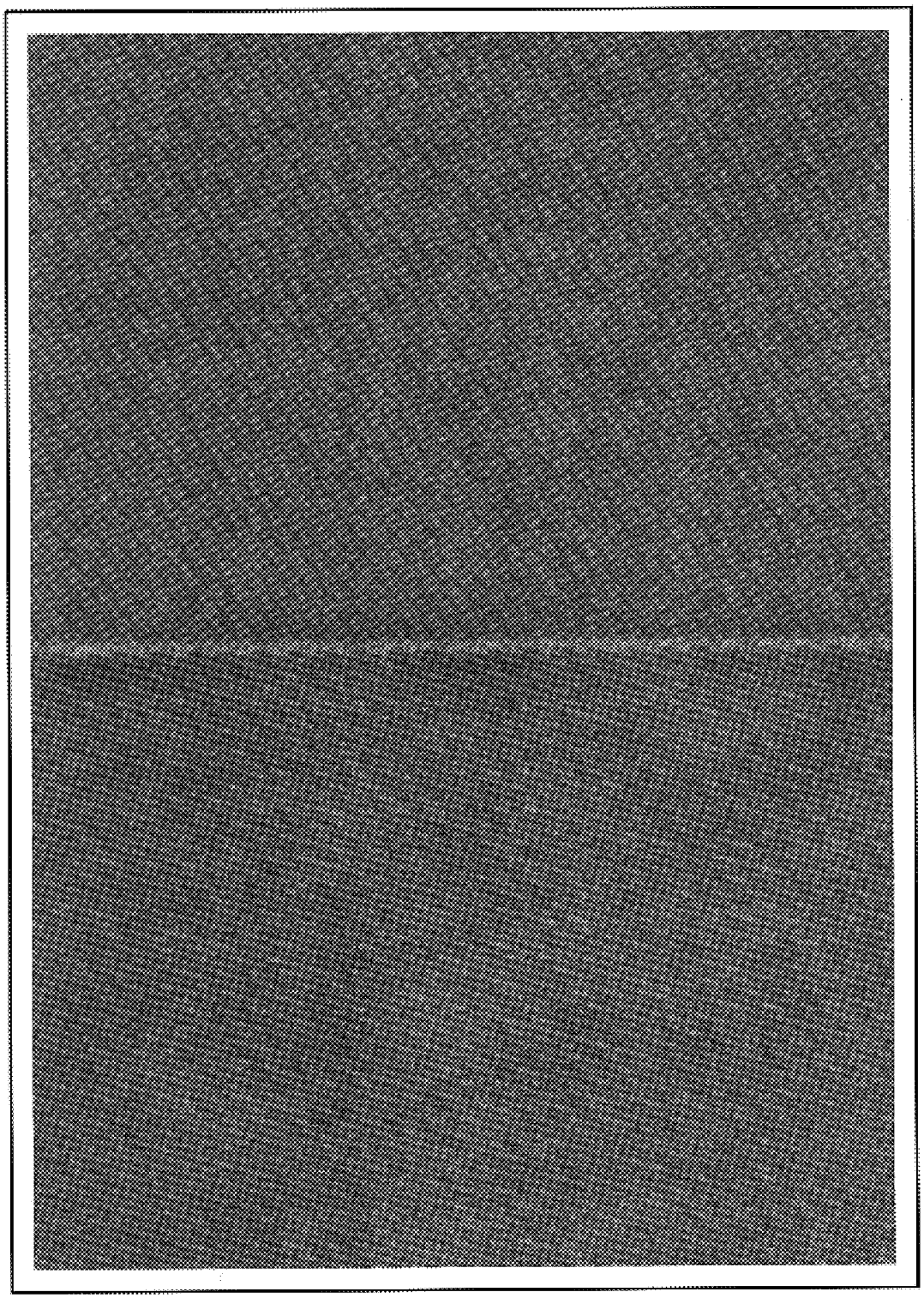
FIG. 1 is an example of an image showing differences in color output at the edge of the image compared to a uniform area region of the image.
Figure 2:
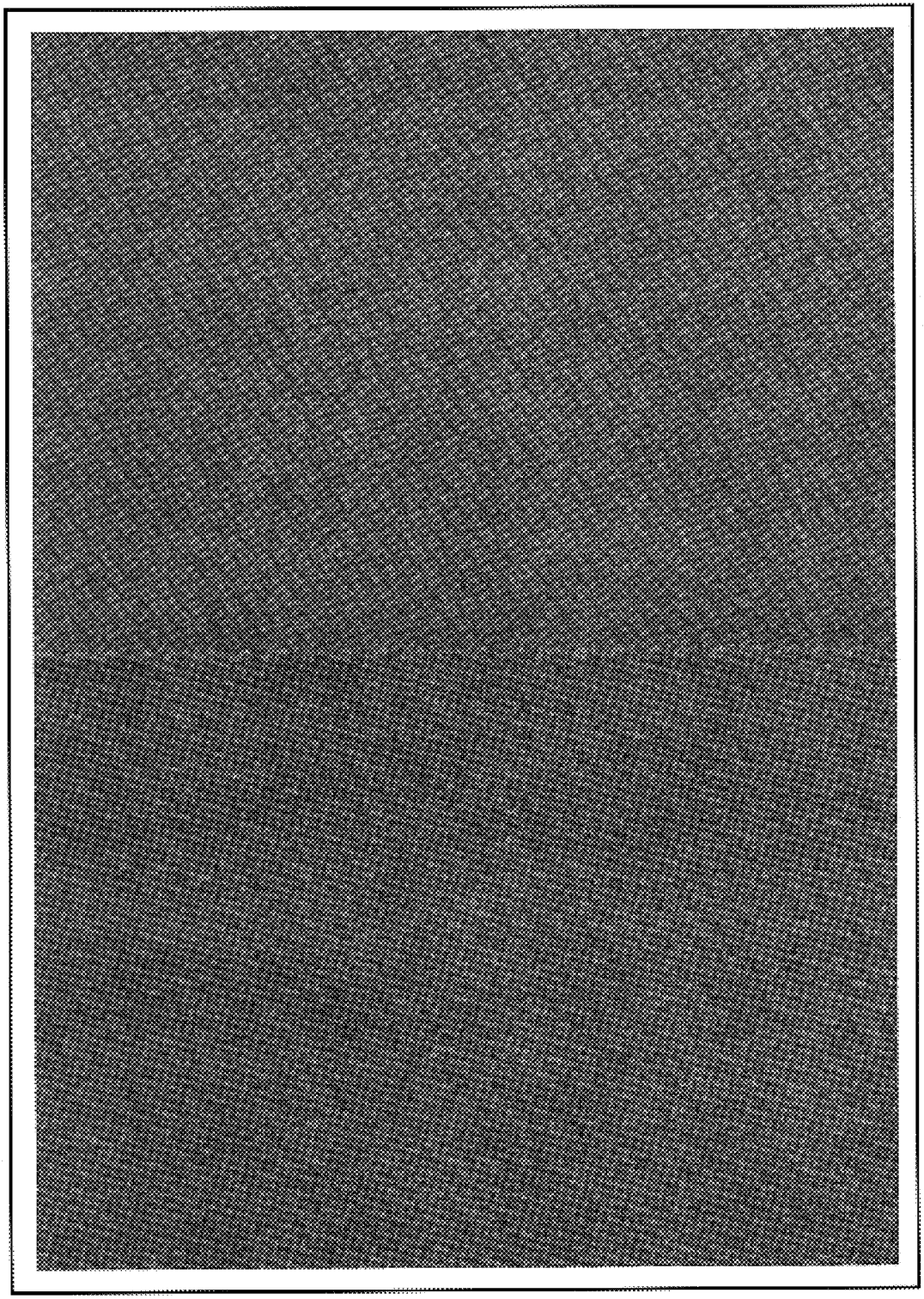
FIG. 2 is an example of the image of FIG. 1 which has been corrected according to a method for correcting for edge defects caused by print characteristics of a print engine.

The method of the invention corrects for edge defects caused by print characteristics of a print engine. FIG. 1 is an example of an image showing the differences in color output at the edge of the image compared to a uniform area region of the image. The edge defects are caused by the print characteristics of the marking system. FIG. 2 is an example of the image of FIG. 1 which has been corrected according to a method for correcting for edge defects caused by print characteristics of a print engine. The method of the invention may be used for color correction of trapped pixels.

A trap engine or trap oracle corrects for edge defects caused by misregistration of the various separations. The trap engine predetermines the best trap color based on the colors associated with the abutting objects, and the color characteristics of the marking system. The method of the invention provides a color correction for marking system characteristics that cause colors to print differently on the edges of images than in uniform areas of images. The method of the invention can be used to apply a color correction (either in the form of a closed-form expression, or a lookup table) to the trap pixels. The color resulting from this correction may or may not lie between the original two abutting colors. Although the same correction algorithm could be applied to all separations present, in some applications, it may be useful to apply a different correction to each separation, as each separation may exhibit different edge physics. The image in FIG. 1 has been printed on a system with a trap engine. The result of the method of the invention creates traps with much lower visibility relative to their uncorrected counterparts, as can be seen in the image of FIG. 2.

In order to correct for edge defects caused by print characteristics of the print engine, a set of color patches are printed. The color patches are sufficiently large (one for each color separation, magenta, cyan, yellow and black) so that color differences between a uniform area region and the edges can be detected. Color differences between the edge region and the uniform area region are measured for each color separation. These differences are used to generate an edge response—a function or table that will cause the marking system to boost or reduce the darkness of the edge pixels so that they match the color of the uniform area region pixels. The edge response can be in the form of a percentage increase or decrease, an analytic function or an edge response correction table.

The method of the invention can be used to correct for edge defects in any edge region of an image and may be used to correct for edge defects in trapped pixels. Trapped pixels are generated by a trapping engine and are designed to correct for misregistration defects caused by overlapping separations. Most trapping processes take the following format:

A. Find edges in the image, no matter how described;
B. For each pair of colors on each side of the found edge, determine:
  1) Whether trapping should be used
  2) If so, what color should be used, and
  3) Where should that color be located or placed
C. Modify the image accordingly.

U.S. Pat. No. 6,345,117 (the "117 patent") describes techniques for implementing several elements of step B. Edge detection (step A) and image manipulation (step C) to perform trapping may be done in any of several standard processes. The 117 patent describes a trap engine which determines the best trap color based on the abutting color pairs, as well as the color characteristics of the marking system. The method in the 117 patent computes a trap table for a predetermined set of color pairs using the CMYK-LAB (nhedra table) mapping of the marking system. This nhedra table is typically generated during the characterization of the system, and is created by measuring the color characteristics of several color patches. As these color patches can be large in comparison to edge defect zones, the nhedra table reflects the color characteristics of the body of these patches, rather than the edges. Therefore, the trap tables generated based on this data produce trap colors that do not completely reflect the edge marking deficiencies.

The method of the invention can be used to apply a color correction to the trap pixels, before they are sent to the marker. This correction serves to "boost" or reduce the darkness of trap colors according to the marker response. This color correction can be in the form of an analytic expression that is applied to each separation of the specified trap color. Alternatively, it can be in the form of a lookup table that is determined prior to page processing. This lookup table could be generated from an analytic function (for example a gamma correction function), or it could be generated based on measurements of the marking differences between edges and solid areas. For the case where a trap table serves as the trap engine, it is possible the trap table itself could be modified with this correction. Alternatively, a separate edge correction table could be used.

The color resulting from the edge response correction may or may not lie between the original two abutting colors. Although, one embodiment could require the separation value of the modified trap color to be bounded by the original colors.

The same correction algorithm or table could be applied to all separations present. Alternatively, it may be more desirable to apply a different correction to each separation, as each may exhibit different edge physics. This is particularly true for multicolor Hybrid Scavengeless Development (HSD) xerographic systems where all toner separations are developed on the same photoreceptor in a layered fashion, leading to a wide variety of nonlinearities.

A color correction table or a color correction analytical function could be determined and installed at the factory prior to shipping of the print engine. The color correction would then be applied before each print job. Alternatively, the edge correction function or table could be updated periodically in the field. In this case, a set of color patches would be printed, the color difference between uniform area regions and edge regions determined and the edge response updated.

The method may also include a correction for color differences in the uniform area regions in images. In this case, the print characteristics of the print engine in uniform area regions are compared against a set of control color patches. The method may further include obtaining a set of control color patches representing the set of desired colors; for each color in the set of desired colors: determining a difference between color in the uniform area region of the actual patch and color in the uniform area region of the control patch; and generating a uniform area response to adjust color output of the print engine in the uniform area region to substantially match color of the control color patch. The uniform area response may include a percentage difference in color for each color in the desired set of colors or a uniform area correction table for each color in the desired set of colors.

If a uniform area response is provided, the edge response may be determined after the actual printed images have been corrected for uniform area defects.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for color correcting trap pixels generated by a trap engine for a print engine that cause colors to print differently on the edges of images than in uniform areas of the images, comprising:
    generating a trap pixel having a trap color based on colors associated with abutting objects and color characteristics of the print engine;
    generating a color correction for the trap pixel comprising:
    for each color seperation, printing a set of actual color patches corresponding to a desired set of colors, wherein each color patch is sufficiently large that color differences between an edge region and a uniform area region can be measured;
        defining an edge region and a uniform area region in each of the patches;
        for each color patch in the set of actual color patches;
            measuring color in the edge region and color in the uniform area region;
            determining a difference between color in the edge region of the patch and color in the uniform area region of the patch; and
            generating an edge response to adjust color output of the print engine in the edge region to substantially match color output in the uniform area region; and
    applying the edge response to the trap pixel.

2. The method of claim 1, wherein the edge region is determined by a trap engine associated with the print engine.

3. The method of claim 1, wherein the desired set of colors comprises cyan, magenta, yellow and black.

4. The method of claim 1, wherein the edge response comprises a percentage difference in color for each color in the desired set of colors.

5. The method of claim 1, further comprising:
    building an edge correction table for each color in the desired set of colors; and
    using the edge correction table to adjust color output of the print engine in the edge region of images.

6. The method of claim 1, further comprising:
    obtaining a set of control color patches representing the set of desired colors;
    for each color in the set of desired colors:
    determining a difference between color in the uniform area region of the actual patch and color in the uniform area region of the control patch; and
    generating a uniform area response to adjust color output of the print engine in the uniform area region to substantially match color of the control color patch.

7. The method of claim 6, wherein the uniform area response comprises a percentage difference in color for each color in the desired set of colors.

8. The method of claim 6, further comprising:
    building a uniform area correction table for each color in the desired set of colors; and
    using the uniform area correction table to correct for uniform area defects.

9. The method of claim 1, wherein the edge region is determined by a trap engine associated with the print; and further comprising:
    building a trap correction lookup table;
    building an edge correction table for each color in the desired set of colors; and
    using the edge correction table to adjust the trap correction lookup table.

10. The method of claim 5, wherein the edge correction table is generated by an analytic function.

11. The method of claim 10, wherein the analytic function comprises a gamma correction function.

12. The method of claim 5, wherein the edge correction table is generated based on actual measurements of the print engine differences between edge regions and uniform area regions.

* * * * *